United States Patent [19]
Irvin

[11] Patent Number: 4,772,948
[45] Date of Patent: Sep. 20, 1988

[54] METHOD OF LOW COST SELF-TEST IN A VIDEO DISPLAY SYSTEM SYSTEM

[75] Inventor: Darrell B. Irvin, Tigard, Oreg.

[73] Assignee: Tektronix, Inc., Beaverton, Oreg.

[21] Appl. No.: 113,590

[22] Filed: Oct. 26, 1987

[51] Int. Cl.$^4$ .............................................. H04N 17/04
[52] U.S. Cl. ................................. 358/139; 324/121 R; 358/10
[58] Field of Search .............. 358/139, 10; 324/121 R

[56] References Cited

U.S. PATENT DOCUMENTS

| | | | |
|---|---|---|---|
| 4,536,760 | 8/1985 | Navarro | 324/121 R |
| 4,607,288 | 8/1986 | Freyberger | 358/10 |
| 4,628,254 | 12/1986 | Bristol | 324/121 R |
| 4,700,227 | 10/1987 | Liebel | 358/139 |

*Primary Examiner*—Howard Britton
*Attorney, Agent, or Firm*—Alexander C. Johnson, Jr.; Robert S. Hulse

[57] ABSTRACT

In a color graphics display system, video analog self-test hardware for testing the system elements between the frame buffer and the CRT display monitor is provided including a bi-directional data bus between the graphics processor and the color map, an analog comparator, an integrator, and an analog multiplexor. The self-test method includes calibrating the self-test circuitry with respect to a reference voltage. The method next includes testing the DACs by outputting predetermined bit patterns to each of the DACs via the frame buffer, measuring each DAC output level in response to each input bit pattern, comparing the DAC output levels to predetermined limits, and reporting the results. Provision is made also for testing the system clock.

18 Claims, 5 Drawing Sheets

METHOD OF LOW COST SELF-TEST IN A VIDEO DISPLAY SYSTEM SYSTEM

RELATED APPLICATION DATA

This application is related to commonly-assigned U.S. patent application Ser. No. 07/113,838, filed on Oct. 25, 1987, by David L. Knierim entitled, "FRAME BUFFER SELF-TEST."

BACKGROUND OF THE INVENTION

This invention relates generally to circuitry and methods for self-testing various elements in a graphic display device, more particularly to self-test by the system of system elements between the frame buffer memory DRAMs and the inputs to a graphic display monitor.

It is becoming common for graphics systems to test themselves without the aid of external fixtures or human observation. This includes both power-on self-test and extended diagnostics of digital circuitry in the graphics system. Most of the system up to and including the frame buffer can be tested without the use of external test instrumentation or feedback from an observer.

One exception has been the display of video information on the monitor. Hardware from the video shift registers to the CRT electron gun has only been testable by viewing the resultant displays on the CRT screen.

The frame buffer itself can be tested by writing test data into the frame buffer and then reading back the test data and comparing it with the input test data. Although the color map itself is testable, it is hard, however, to test the video shift registers feeding the color map and the data path between the color map and the DACs. In normal system operation, there is only a one directional data path out of the frame buffer through the color map and DACs and so its signals cannot be read from the system's processor. It is also hard to test the signals at the outputs of the DACs by use of external test instrumentation. In prior systems, everything from the frame buffer outputs downstream to the CRT display, except the color map RAM, is not automatically testable. Its operation can only be observed by looking at the CRT display and working back manually.

Accordingly, a need remains for a better way to test elements of a graphics system between the frame buffer and the CRT display monitor.

SUMMARY OF THE INVENTION

This invention provides an inexpensive way to test the system downstream from the frame buffer: from the frame buffer DRAMS through the digital to analog converters (DAC) and video amplifiers.

A video display system including self-test capability includes apparatus for generating digital video data, such as a graphics processor, which also generates a variable duty cycle squarewave (VDS) and has a digital input port. At least one digital to analog converter (DAC) receives digital data from the graphics processor and converts it to an analog signal for input to a cathode ray tube monitor for displaying a graphics image. An integrator is provided for integrating the VDS. An analog comparator receives the integrated VDS signal at one of its inputs and a selected analog signal for comparison at its other input. The comparator output is connected to the digital input port. A reference voltage is input to the comparator for calibrating the VDS.

The output of each DAC in the system, three in an RGB color system, may be selectively input to the comparator. After the desired input is selected, the graphics processor varies the duty cycle of the VDS and thereby varies the output of the integrator until the integrated VDS output is equal to the output of the DAC under test. Then, the duty cycle of the VDS is compared to the duty cycle of the VDS when calibrated against the reference voltage, for measuring the analog voltage level at the output of the selected DAC. The results are compared to limits stored in the processor and any errors are reported, for example, visually on the monitor. This procedure can be repeated for various DAC levels. The test can be repeated for each DAC and for the system clock.

DETAILED DESCRIPTION

Figure 1:
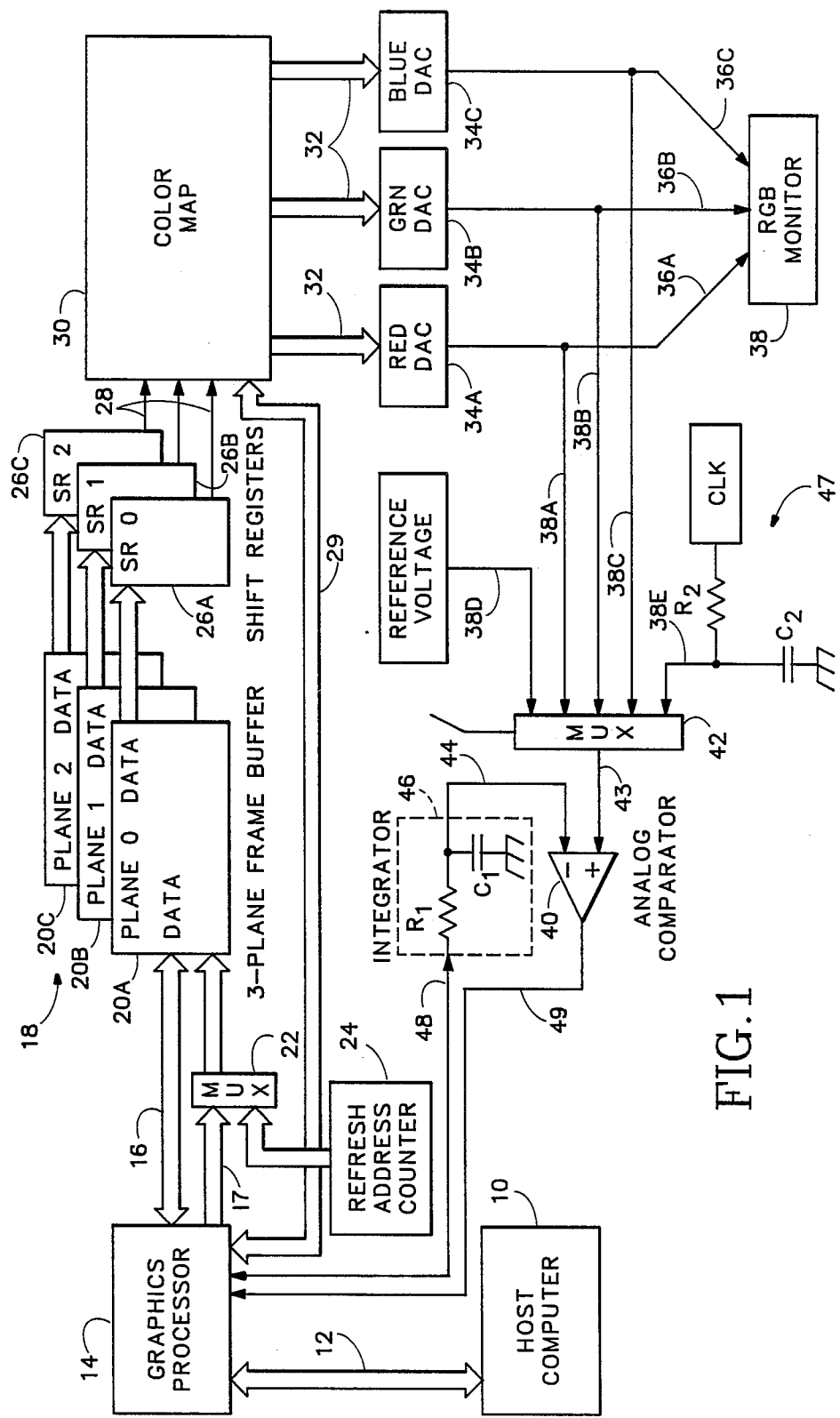
FIG. 1 is a block diagram of a CRT graphics systems incorporating frame buffer self-test circuitry in accordance with the invention.

FIG. 1 shows a typical graphics display system in which the invention is implemented. This system includes a host computer 10 which exchanges data by way of a suitable bus 12 with a graphics processor or picture processor 14. This data includes graphics commands which are translated by the graphics processor and associated circuitry into pixel data. The pixel data, typically including a pixel address and pixel value, is sent by way of a second bus 16 (for data) and 17 (for address and control) to a frame buffer subsystem 18.

The frame buffer system includes several planes (for color) of frame buffer memory for storing the pixel values in the addressed locations and outputting them a raster lines at a time and a pixel at a time in each raster line. In this illustrative example, three planes 20A, 20B and 20C are shown for storing 3-bit pixel values, corresponding to eight color shades. The frame buffer subsystem conventionally includes circuitry (not shown) which addresses the frame buffer for loading of pixel values into the appropriate address locations. Control information from the graphics processor is input to this circuitry by way of a multiplexer 22 in bus 17. A second set of control data is input through multiplexer 22 from a refresh address counter 24.

Pixel data is output a raster line at a time from each plane of the frame buffer to a set of parallel-to-serial shift registers 26A, 26B and 26C corresponding to the planes of the frame buffer. Each pixel value is output from these shift registers serially (three parallel bits in a three plane buffer system) over output lines 28 to a color map 30. Values in the color map can be loaded directly from the processor 14 via address and bidirectional data lines 29. In normal operation of the system, the color map provides three sets of digital outputs 32 to digital-to-analog converters, referred herein as the red DAC 34A, the green DAC 34B and the blue DAC 34C. Each of the DACs outputs an analog signal via its respective output line 36A, 36B, 36C, to RGB monitor 38.

The color map is a look-up table which translates pixel values from the shift registers into RGB (red, green and blue) triplets which are groups of three digital words that feed the DACs. The color map can be written to and read from the graphics processor, so it can be tested even without this invention. The parts not previously tested are the address path from the refresh address counter to the video DRAMs and the data paths from the video DRAMs through the shift registers to the color map and from the color map RAMs through the DACs to the video amplifiers. This invention enables the correct function of the DACs to be tested by accurately measuring the DC levels output by the DACs for a given input code.

The test hardware includes a test comparator 40 that has as its non-inverting (high) input signal 43 the signals passed through a multiplexer 42 from each of the calibration and test signal lines (Red DAC 38A, Green DAC 38B, Blue DAC 38C, VRef 38D and Clock 38E). These signals are used in the following tests. The comparator output 49 is input to a digital input port of the graphics processor (or other microcomputer used for the test). Multiple comparators can be used, omitting the multiplexer, if enough input ports are available. The comparator can be relatively slow but must be accurate.

The comparators have a inverting (minus) input line 44 which inputs an integrated output signal from an integrator 46 having, as its input on line 48, a variable duty-cycle cycle square wave signal from the digital output port of the processor 14. The manner of generating this signal is discussed below.

Figures 2, 3:
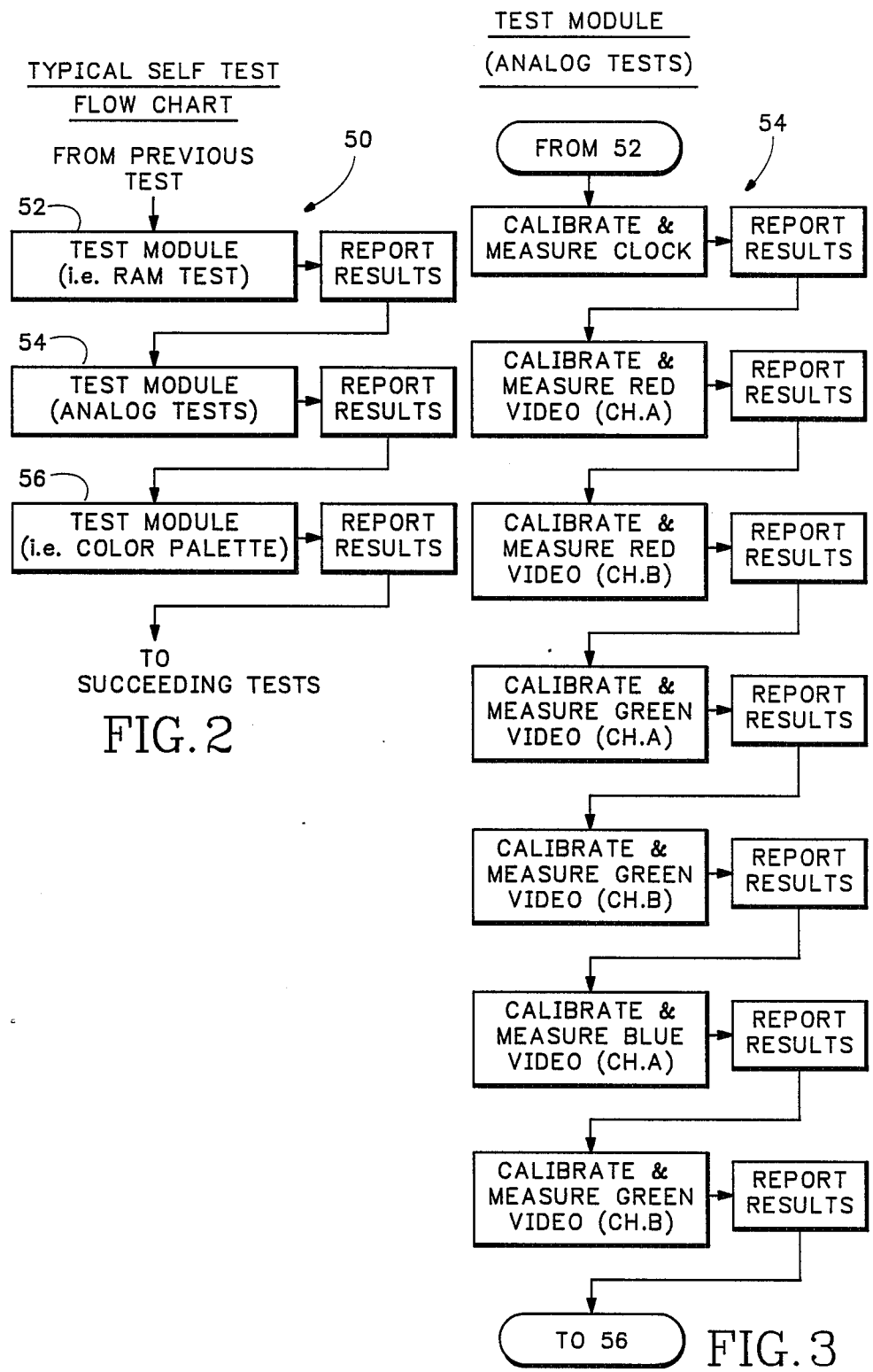
FIG. 2 is a flow chart of a typical software routine for self-testing the graphics system of FIG. 1.
FIG. 3 is a flow chart of the analog test module shown in FIG. 2 for self-testing in accordance with the invention.

FIG. 2 shows a flow chart of a typical self-test routine 50. This test proceeds sequentially through a number of tests such as a conventional RAM test 52, followed by the analog test module 54 of the present invention, followed by a conventional color palette test 56 and other tests as required.

Figure 4:
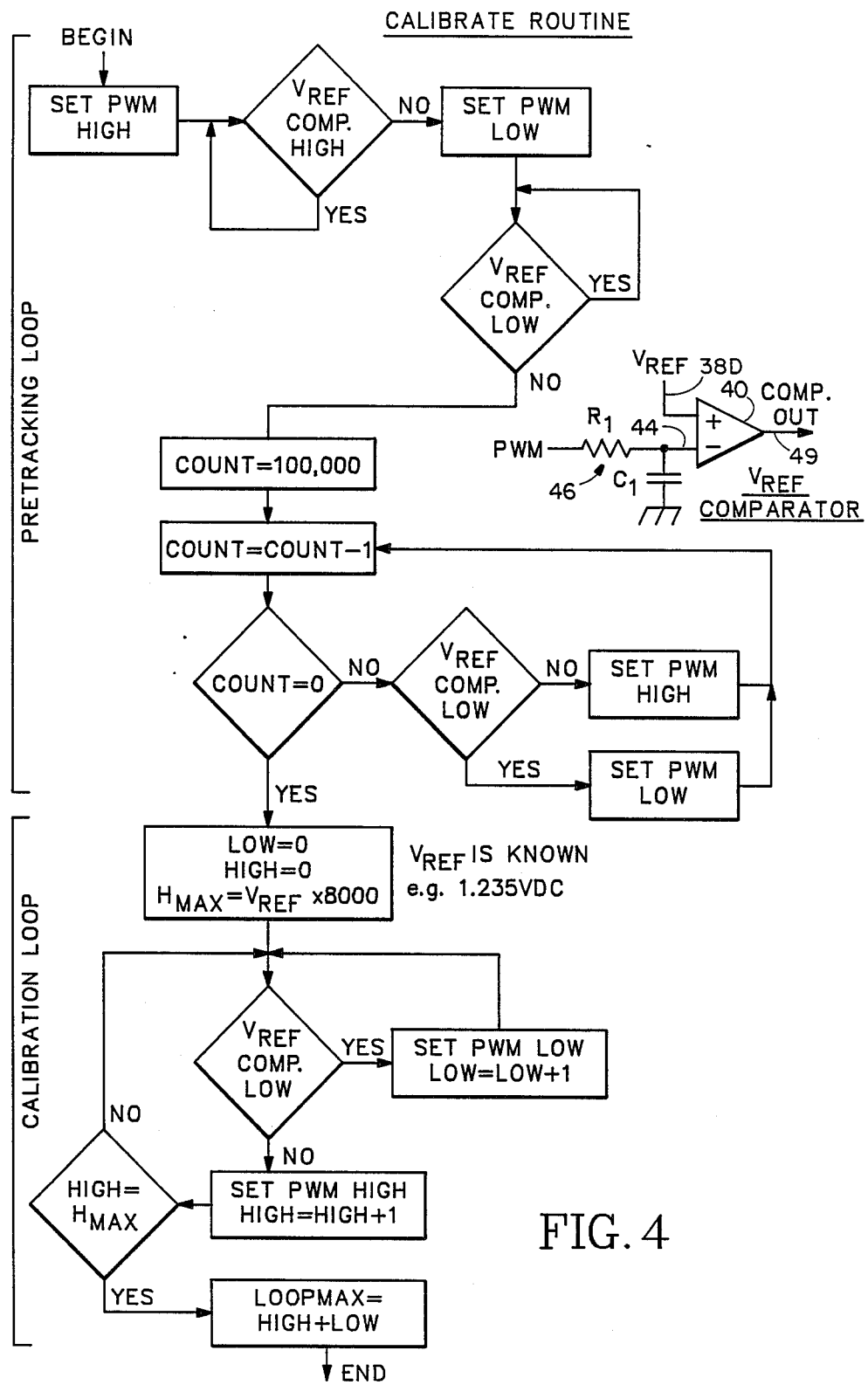
FIG. 4 is a flowchart of the calibration procedure used in the various tests of FIG. 3.
Figure 6:
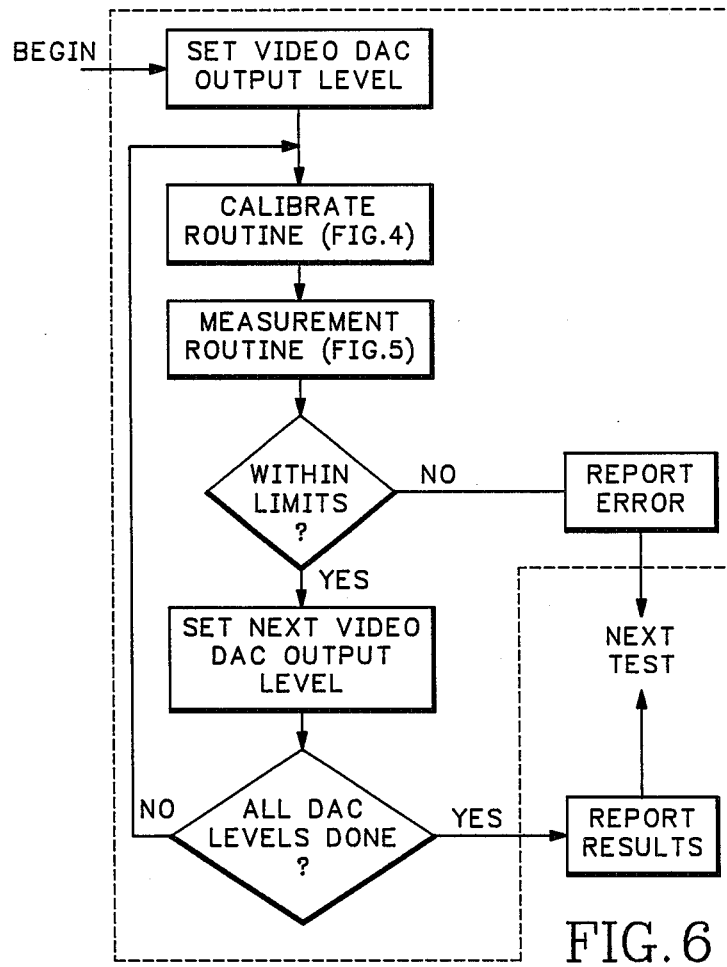
FIG. 6 is a flowchart of the video measurement loop used in each procedure shown in FIG. 3.

FIG. 3 shows the analog test module 54 used in the present invention in further detail. This module performs a series of analog measurements on the display system. As shown in further detail in FIG. 6, each measurement is essentially in form:

a. The measurement system is calibrated against VRef;

b. The desired parameter is measured and compared against predetermined limits; and c. The results are reported. The test then proceeds to the next parameter to be tested. FIG. 4 shows the calibrate routine employed in the calibrate portion in each of the subtests shown in the analog test module 54 of FIG. 3. For convenience, the comparator 40 and integrator 44 are reproduced with VRef shown as the signal input to the high of the comparator. The variable PWM is the variable duty cycle square wave input to the integrator. The purpose of this test is to determine a variable (LOOPMAX) such that the system is calibrated to eight counts per millivolt. This routine consists of two sections.

The pre-tracking loop shown in the upper portion of FIG. 4 tracks the VRef signal by setting PWM high and then low. This procedure is carried for a long period of time (count=100,000) in order to remove any charge memory effects of capacitor C1 in integrator 44.

Next is the calibration loop shown in the lower portion of FIG. 4. This loop tracks the reference voltage (VRef) until the comparator has been set high (PWM set high) eight times the reference voltage in millivolts (VRef) (that is, volts×8,000). For example, if VRef=1.235 VDC, H MAX=9880. Once this count is reached the total loop count (LOOPMAX) is equal to the sum of the variables HIGH plus LOW. Using this value in future measurement loops allows calculating measured values directly in millivolts (see measurement loop in FIG. 6).

Figure 5:
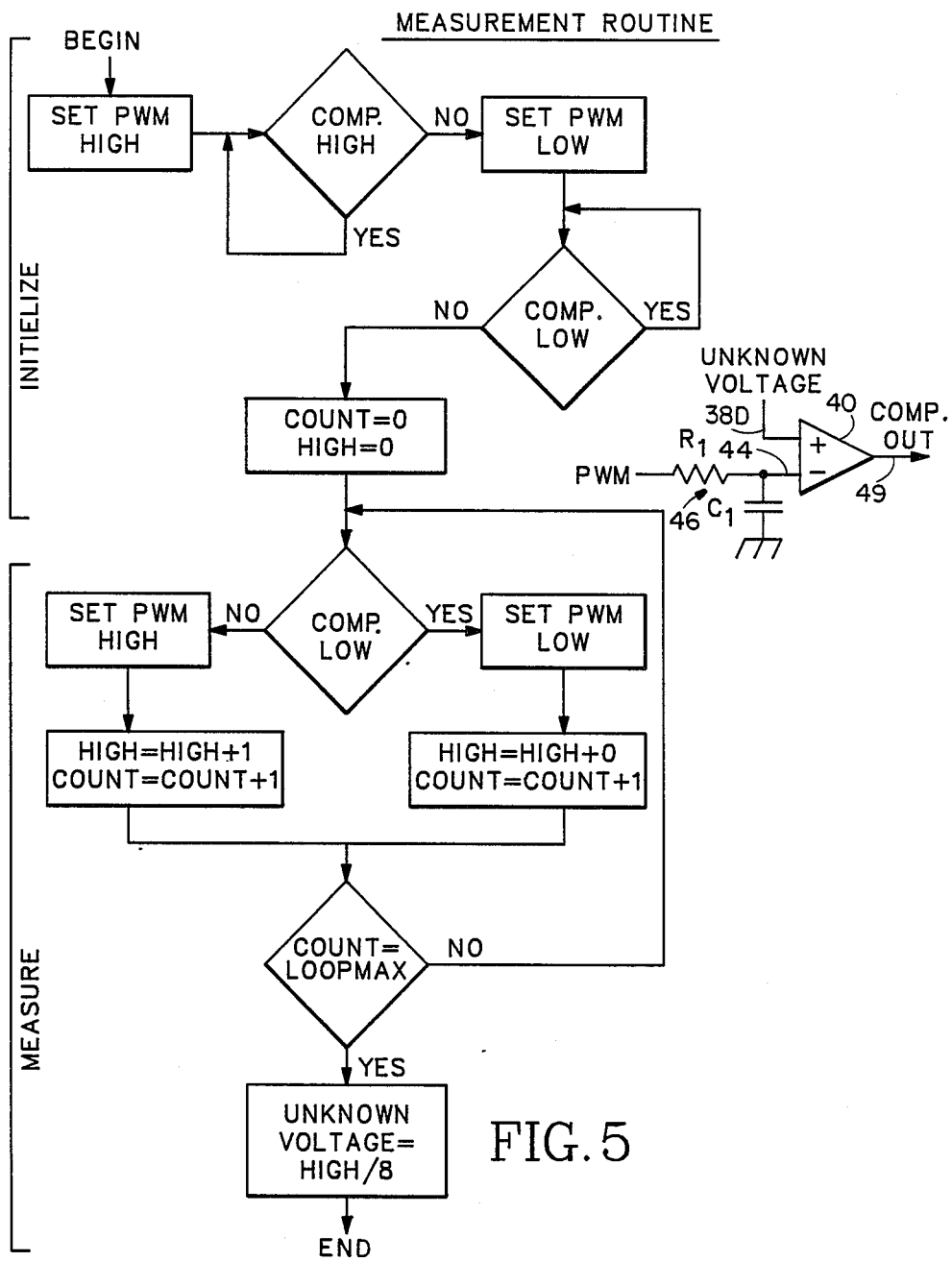
FIG. 5 is a flowchart of the measurement procedure used in the various tests of FIG. 3.

The measurement routine is shown in FIG. 5. The purpose of the measurement is to measure an unknown system voltage, for example, the outputs of the red, green, and blue DACs on lines 38A, 38B, 38C. This routine also consists of two sections.

The first section is the initializing loop. This loop sets PWM high until the voltage at the inverting (minus) input of the comparator is greater than the unknown voltage (comparator is low). It then sets PWM low and waits until the inverting input is lower than the unknown voltage (comparator is high). The variables COUNT and HIGH are now initialized to zero and the routine proceeds to the measurement loop.

The measurement loop executes a fixed number of times (LOOPMAX as determined by the calibrate routine), setting PWM low when the comparator is low or setting it high when the comparator is high. A count (High) is kept of the number of times the PWM output was set high. After (LOOPMAX times through the loop, the value of HIGH is eight times the unknown voltage (in millivolts).

Measurement of the various video levels and the clock waveform use the routines described above in the loop shown in FIG. 6. Each video signal to be measured is connected separately to the comparator (or to separate comparators). The system is calibrated (calibrate routine) and then the analog voltage (e.g., red video) is measured. The measurement is compared against limits stored in the system processor and the routine moves to the next measurement. In this manner a number of voltages on each video channel can be measured, thus assuring that each video DAC is functioning. Out-of-specification measurements are reported as errors.

Measurement of the clock waveform is similar, except that the clock is first integrated by an RC network 47 (R2, C2), to generate an unknown voltage proportional to the duty cycle of the clock. This signal is then input to comparator 40 through multiplexer 42 in the same manner as the reference voltage and the DAC output signals. If the measured voltage on line 38E is within limits, then the clock is known to be running, i.e., not stuck high or low.

Having described and illustrated the principles of my invention and preferred embodiments, it should be apparent to those skilled in the art that the invention may be modified in arrangement and detail without departing from such principles. I claim all modifications coming within the scope and spirit of the following claims.

I claim:

1. A display system with video analog self-test capability comprising:
   means, including a graphics processor, for generating digital video data;
   the processor having means for generating a variable duty cycle squarewave and having a digital input port;

a digital to analog converter (DAC) for receiving the digital video data and converting the digital video data to an analog signal for input to a cathode ray tube monitor to display a graphics image;

an integrator circuit for integrating said variable duty cycle squarewave;

an analog comparator for comparing the analog signal to the integrated variable duty cycle squarewave; and means for connecting the output of said analog comparator to the digital input port.

2. The display system of claim 1 wherein said generating means includes three outputs to provide color digital video data to three DACs, and means for separately comparing the output of each DAC to the integrated squarewave.

3. The display system of claim 1, further comprising:
a clock integrator for integrating the system clock signal;
means for inputting the integrated system clock signal to the analog comparator;
means for varying the duty cycle of the squarewave and thereby varying the output of the integrator until said output is equal to the integrated system clock signal;
means in the processor for comparing the duty cycle of the squarewave, when the integrated squarewave equals the integrated system clock signal, to the duty cycle of the squarewave when the integrated squarewave is equal to the reference voltage;
means in the processor for testing the output signal of said comparison means against predetermined limits to determine whether the clock is running; and
means for reporting the result of said test.

4. The display system of claim 1, including:
means for inputting a reference voltage to the comparator; and
means in the processor for calibrating the variable duty cycle squarewave and the integral thereof against the reference voltage.

5. The display system of claim 4, including:
means for varying the duty cycle of the square wave and thereby varying the output of the integrator until said output is equal to the output of the DAC; and
means for comparing the duty cycle of the square wave, when the integrator output equals the output of the DAC, to the duty cycle of the square wave when calibrated against the reference voltage to measure the DAC output signal level.

6. The display system of claim 5, including:
means for comparing the DAC output signal level to predetermined limits; and
means for reporting the results of said comparison to a user.

7. A method of self-testing in a video display system comprising:
setting a DAC input;
calibrating the self-test circuitry;
converting the DAC input signal to an analog signal;
measuring the analog signal at the DAC output;
comparing the analog signal level to predetermined limits; and
reporting the result of said comparison.

8. The method of claim 7 wherein setting a DAC input comprises:
generating digital test data; and
outputting the digital test data to the DAC inputs.

9. The method of claim 7 further comprising providing an integrator connected to receive the system clock signal; and
selecting the integrated system clock signal as the analog signal to be measured.

10. The method of claim 7 wherein said measuring comprises:
initializing the system to bring the integrated binary signal level substantially equal to the DAC output voltage;
determining a third value representative of the duty ratio of the binary signal; and
calculating the analog signal level from the third value.

11. The method of claim 10 wherein said initializing comprises:
(a) setting the binary signal to a logical high state;
(b) integrating the binary signal;
(c) comparing the integrated binary signal level to the DAC output voltage;
(d) repeating steps (b) and (c) until the integrated binary signal level exceeds the DAC output voltage;
(e) setting the binary signal to a logical low state;
(f) integrating the binary signal;
(g) comparing the integrated binary signal level to the DAC output voltage;
(h) repeating steps (f) and (g) until the integrated binary signal level falls below the DAC output voltage.

12. The method of claim of 10 wherein said determining a third value comprises:
(a) comparing the integrated binary signal level to the DAC voltage;
(b) selectively setting the logical state of the binary signal in response to the comparison;
(c) counting the times the binary signal is set to a logical high state to determine a high count;
(d) counting the times the binary signal is set to a logical low state to determine a low count;
(e) summing the high count and the low count to determine a loop count;
(f) repeating the steps (a) through (e) until the loop count equals a predetermined number; and
(g) calculating the third value as equal to the high count.

13. The method of claim 10 wherein said calculating the analog signal level comprises dividing the third value by a predetermined number.

14. The method of claim 7, wherein the display system includes means for generating a binary signal, further comprising providing an integrator for integrating the binary signal; wherein said calibrating comprises:
pretracking to bring the integrating binary signal voltage level substantially equal to the reference voltage; and
executing a calibration loop to determine the duty ratio of the binary signal.

15. The method of claim 14 wherein said pretracking comprises:
(a) setting the binary signal to a logical high state;
(b) integrating the binary signal;
(c) comparing the integrated binary signal level to the reference voltage;
(d) repeating steps (b) and (c) until the integrated binary signal level exceeds the reference voltage;
(e) setting the binary signal to a logical low state;

(f) integrating the binary signal;

(g) comparing the integrated binary signal level to the reference voltage;

(h) repeating steps (f) and (g) until the integrated binary signal level falls below the reference voltage;

(i) comparing the reference voltage to the integrated binary signal level;

(j) setting the logical state of the binary signal in response to the comparison of step (i) so as to urge the integrated binary signal level toward the reference voltage; and (k) repeating steps (i) and (j) a predetermined number of times such that the memory effects of the integrator are dissipated.

16. The method of claim 14, further comprising providing an analog comparator connected to the integrator for receiving the integrated binary output signal; and wherein said graphics processor includes a digital input port for receiving the analog comparator output signals.

17. The method of claim 9, wherein executing the calibration loop comprises:

multiplying the reference voltage by a predetermined number to determine a first value; and determining a second value such that the duty ratio of the binary signal is the ratio of the first value to the second value.

18. The method of claim 17, wherein said determining a second value comprises:

(a) comparing the integrated binary signal level to the reference voltage;

(b) setting the binary signal to a logical low state in response to the integrated binary signal level exceeding the reference voltage;

(c) setting the binary signal to a logical high state in response to the reference voltage exceeding the integrated binary signal level;

(d) counting the times the binary signal is set to a logical high state to determine a high count;

(e) counting the times the binary signal is set to a logical low state to determine a low count;

(f) repeating steps (a) through (e) until the high count equals the first value; and (g) summing the high count and the low count to determine the second value indicating the total number of times the calibration loop was executed.

* * * * *